United States Patent
Hill et al.

[11] 4,026,632
[45] May 31, 1977

[54] FREQUENCY SELECTIVE INTERWAVEGUIDE COUPLER

[75] Inventors: Kenneth O. Hill; Akira Watanabe, both of Kanata, Canada

[73] Assignee: Canadian Patents and Development Limited, Ottawa, Canada

[22] Filed: Jan. 7, 1976

[21] Appl. No.: 647,102

[52] U.S. Cl. .................. 350/96 C; 350/96 WG
[51] Int. Cl.² ............................. G02B 5/14
[58] Field of Search ............... 350/96 C, 96 WG

[56] References Cited

UNITED STATES PATENTS

| | | | |
|---|---|---|---|
| 3,589,794 | 6/1971 | Marcatili | 350/96 WG |
| 3,753,157 | 8/1973 | Ash et al. | 350/96 WG |
| 3,850,503 | 11/1974 | Riseberg et al. | 350/96 C |
| 3,957,341 | 5/1976 | Taylor | 350/96 C |

Primary Examiner—John K. Corbin
Assistant Examiner—Stewart Levy
Attorney, Agent, or Firm—Edward Rymek

[57] ABSTRACT

The coupler consists of an intermediate finite length waveguide located between a first and at least one second waveguide with the refractive index of the intermediate waveguide being greater than the refractive indices of the other waveguides. The intermediate waveguide further includes a structure which either in a fixed manner as by a surface relief, or in a controlled manner—as by electro-optic or acousto-optic perturbation, produces modes of propagation in the intermediate waveguide for a preselected frequency, such that energy may be coupled to or from the waveguides to the intermediate waveguide by mode matching and this energy may be converted from one mode to another in the intermediate waveguide.

7 Claims, 8 Drawing Figures

FREQUENCY SELECTIVE INTERWAVEGUIDE COUPLER

This invention is directed to a device for coupling electromagnetic energy between adjacent waveguides and in particular to optical couplers which are highly frequency selective.

With the advent of the development of optical transmission systems for the efficient communication of data and the like, a need has arisen for the development of elements for the coupling of optical energy to and from waveguides and between waveguides. For the efficient operation of such systems in the field of data transfer, it is also desireable that these elements be frequency selective such that multiplexing of optical data streams might be feasible to date, these needs to a great extent have not been completely fulfilled.

It is therefore an object of this invention to provide a coupler for frequency selective coupling between waveguides.

It is a further object of this invention to provide a coupler for controlled coupling between waveguides.

It is another object of this invention to provide a coupler for coupling between dissimilar waveguides.

These and other objects are achieved in a coupler which includes an intermediate waveguide located between a first and at least one second waveguide. The refractive index of the intermediate waveguide is greater than the refractive indices of the other waveguides and includes a means for controlling the propagation characteristics of the intermediate waveguide such that it will propagate energy therethrough in several propagation modes for a preselected frequency and energy is converted from one mode which is mode matched to the first waveguide to another mode which is mode matched to one of the second waveguides. The means for controlling the propagation characteristic of the intermediate waveguide may include a fixed surface-relief pattern or an actively controlled perturbation such as by electro-optic, acousto-optic, or other such methods.

Figure 1:
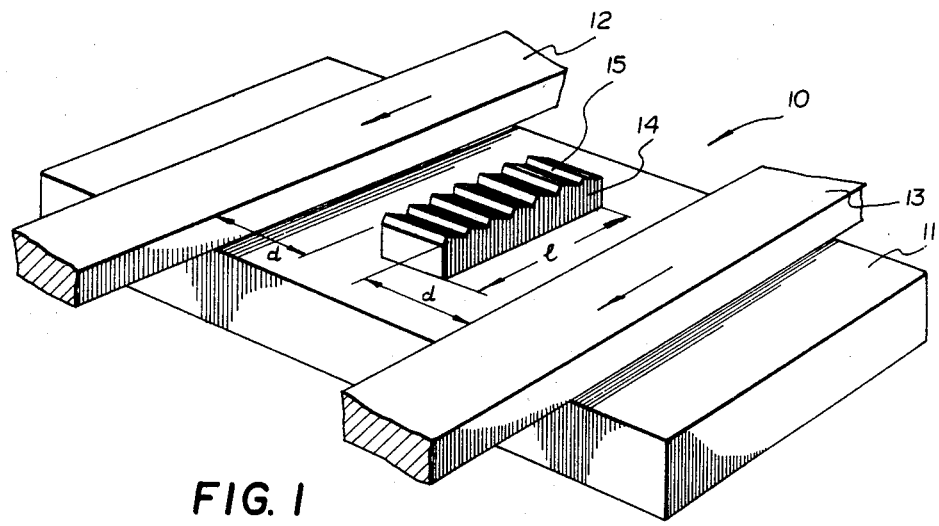
FIG. 1 illustrates a coupler in accordance with this invention.

FIG. 1 illustrates one embodiment of a coupler in accordance with the present invention. The coupler 10 includes a first waveguide 12 and a second waveguide 13. These waveguides are shown to be of rectangular cross-section but may be of any conventional shape and general index profile distribution, and consequently may possess quite general propagation characteristics. In addition, the waveguides 12 and 13 may be similar or dissimilar and have the same or different refractive indices $n$. These waveguides 12 and 13 are formed on a suitable substrate 11 which has a refractive index smaller than that of either of the waveguides 12 or 13.

The coupler 10 further includes an intermediate waveguide stub 14 of finite length and also of general propagation characteristics except that its refractive index $n_i$ is greater than either of the two waveguides 12 or 13 and it has a surface-relief pattern on one surface 15. The waveguide stub 14 is located between the waveguides 12 and 13 with a separation distance $d$ of at least 0.1 λ but not greater than 2λ of the energy propagating through the waveguides 12 and 13.

Figure 2:
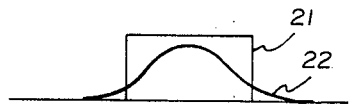
FIG. 2 illustrates the field distribution of optical energy propagation along a waveguide.
Figure 3:
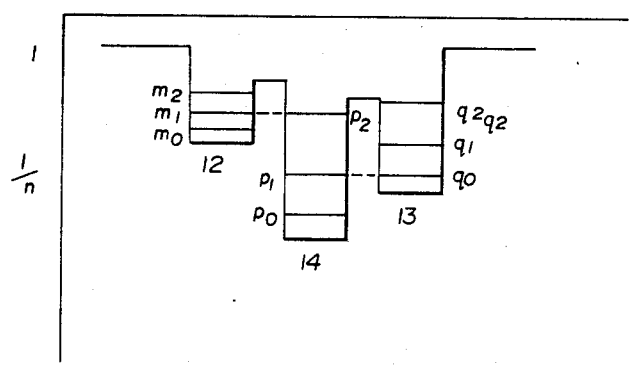
FIG. 3 illustrates the effective refraction index profile of the coupler in FIG. 1.

Electromagnetic energy at optical frequencies is guided along the waveguide 12. At any particular frequency, and for appropriate dimensions, energy may be propagated along waveguide 13 in one or more modes with a field distribution of the fundamental mode as shown in FIG. 2 wherein 21 represents the waveguide and 22 represents the field distribution. As can be seen, the field 22 extends outside the waveguide 21 and therefore can be coupled to a further waveguide under proper conditions. FIG. 3 illustrates the phase velocity synchronization condition by virtue of which coupling takes place between waveguides 12 and 13 in device 10 shown in FIG. 1. The effective refractive index profile for waveguide 12, waveguide stub 14 and waveguide 13 is plotted in cross-section together with the modes $m_i$, $p_i$, $q_i$, which each of the waveguides 12, 14 and 13 respectively will support at a selected wave length λ. The corrugated stub 14 is constructed so as to have one mode ($p_2$) match with one of the modes ($m_1$) in waveguide 12 and to have another mode ($p_1$) match with one of the modes ($q_o$) in waveguide 13 which constitutes phase velocity synchronization. The corrugation or perturbation 15 on stub 14 allows energy to be transferred from one mode to the other in stub 14 and therefore the waveguides 12 and 13 are completely coupled together. Since the modes will shift with change in frequency, phase velocity synchronization will not take place for frequencies other than the selected frequency and therefore the coupler 10 is frequency selective.

As described above with respect to FIG. 1, the distance $d$ between the waveguides 12, 13 and stub 14 should be between $0.1\lambda_o$ and $2\lambda_o$ such that they are close enough to achieve coupling between the stub 14 and each waveguide 12 and 13, but far enough to prevent direct coupling between the waveguides 12 and 13 if they possess sufficiently similar characteristics. The length $l$ of the stub will depend on the distance $d$, the geometry of the perturbations, the refractive index differences and the modes of interest and is selected to achieve a balance between the coupling lengths required:

a. to couple from waveguide 12 to stub 13, b. to convert from one mode to the other in stub 14; and c. to couple from stub 14 to waveguide 13.

It is further noted that the coupler in accordance with this invention can couple energy in either direction or both, i.e. from waveguide 12 to waveguide 13, from waveguide 13 to waveguide 12, or both.

Figure 4:
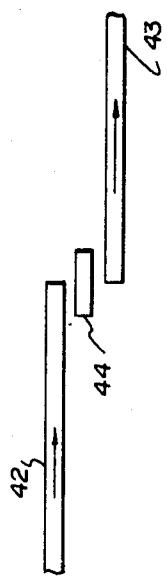

If the waveguides 12 and 13 have similar characteristics, it is preferred to avoid close proximity between the waveguides for long distances. To achieve this, the coupler in accordance with this invention may take either of the forms shown schematically in FIGS. 4 and 5. In FIG. 4, the waveguides 42 and 43 are terminated as they overlap the mode-matching waveguide 44, thus localizing the coupling region. Waveguide 44 must however overlap each of the waveguides 42 and 43 to allow coupling between it and the waveguides 42 and 43.

Figure 5:
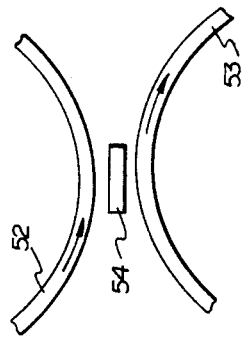
FIGS. 4 and 5 illustrate other coupler arrangements in accordance with this invention.

In FIG. 5, the waveguide 52 and 53 are curved away from one another such that they are in close proximity only at the mode-matching waveguide 54 to allow coupling to waveguide 54.

The coupler illustrated in FIG. 1 includes a mode-matching waveguide 14 having fixed perturbations 15 on one surface. However, these perturbations in the waveguide properties may be controlled by temporarily creating them using electro-optic effects, acousto-optic effects or other well known effects some of which are described in the book Quantum Electronics, by A. Yariv and published by John Wiley and Sons. One convenient method of obtaining the desired control over the waveguide stub is by fabricating it out of an acousto-optic material. Frequency-selective switching can then be obtained by launching an acoustic wave on the surface of the stub by means of properly designed electrodes. The same result can be obtained by the use of a properly designed electrode configuration in conjunction with an electro-optic material. In fact any technique which enables a periodic perturbation of the propagation characteristics of the waveguide stub in a rapidly controlled manner would suffice. Such a coupler would permit periodic on and off switching of the coupler as well as control over the frequency of the optical energy to be switched.

Since the coupler in accordance with the invention is frequency selective, reversible and may be actively controlled, it may be used in switch structures for the multiplexing and demultiplexing of optical data streams or in integrated optical switch banks.

Figure 6:
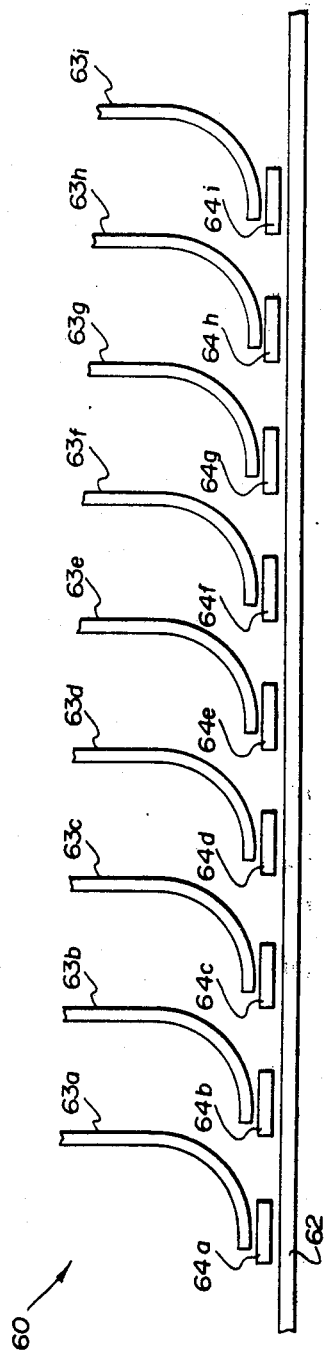
FIG. 6 illustrates an optical multiplexer or demultiplexer having couplers in accordance with this invention.

In the multiplexer-demultiplexer 60 illustrated in FIG. 6, a multifrequency data stream is propagated along waveguide 62 which is located adjacent to a series of waveguides 63a, 63b, 63c . . . and individually coupled to each of these waveguides by a series of mode-matching or stubs 64a, 64b, 64c . . . . The stubs 64a, 64b . . . are constructed so as to mode-match the waveguide 62 to each of the waveguide 63a, 63b . . . such that they are coupled to waveguide 62 for different frequencies allowing the multi-frequency data stream to be dissected into its individual component frequencies which are then propagated along the waveguides 63a, 63b, 63c . . . .

However, since the couplers in accordance with this invention are reversible, individual component frequencies propagating along waveguides 63a, 63b . . . may also be combined in waveguide 62 by the mode-matching waveguides 64a, 64b . . . .

Figure 7:
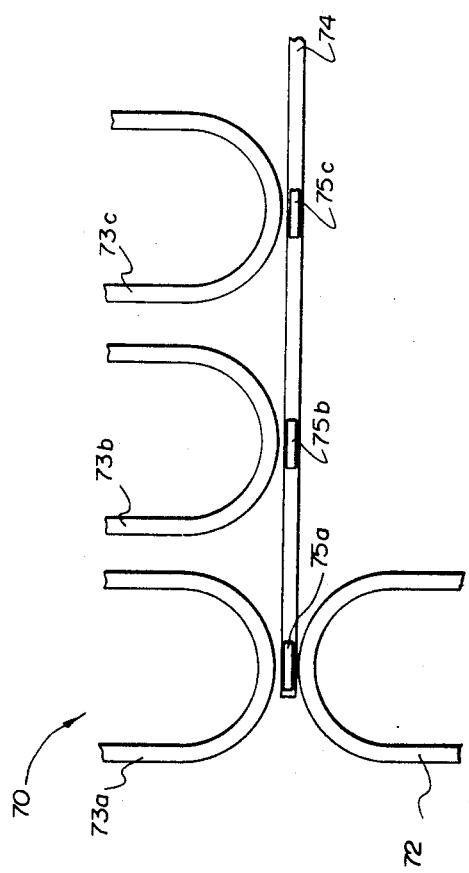
FIGS. 7 and 8 illustrate two views of an optical switch having couplers in accordance with this invention.
Figure 8:
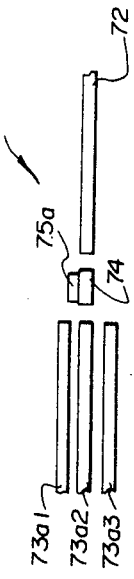

FIGS. 7 and 8 illustrate one possible optical switch 70 geometry that is actively controlled. Switch 70 includes a waveguide 72 located adjacent a mode matching waveguide 74, and a series of groups of waveguides 73a, 73b, 73c . . . positioned adjacent to and along the mode-matching waveguide 74. Each group of waveguide 73a, 73b, 73c can include $n = 1, 2, 3, \ldots$ waveguides 73an, 73bn, 73cn, respectively in slightly different planes as shown in FIG. 8. Each waveguide in the group having slightly different waveguide characteristics from the other. Switch 70 further includes a series of means 75a, 75b, 75c adjacent each of the groups 73a, 73b, 73c for perturbing the characteristics of mode-matching waveguide 74 in a controlled manner. In operation, waveguide 74 is perturbed by means 75a to obtain phase velocity synchronization between waveguides 72 and 74 and the optical energy propagating in waveguide 72 is coupled into mode-matching waveguide 74 and with proper control, the energy may be further coupled to one of the waveguides 73an or to none of these waveguides and this allowed to propagate along mode-matching waveguide 74. If it is desired to couple this optical energy into one of the waveguide 73bn or 73cn, the respective perturbation means 75b or 75c is activated in a predetermined manner. Switch 70 may therefore be used to couple energy into any desired waveguide in a random fashion.

We claim:

1. A frequency selective optical coupler comprising:
   a first optical waveguide having a refractive index $n_1$;
   at least one second optical waveguide having a refractive index $n_2$;
   an intermediate optical waveguide having a finite length and a refractive index $n_3$ greater than the refractive indices $n_1$ and $n_2$, said intermediate waveguide located between the first waveguide and the second waveguide at a predetermined distance $d_1$ from the first waveguide and at a predetermined distance $d_2$ from the second waveguide, wherein $0.1\lambda < d_1 < 2\lambda$ and $0.1\lambda < d_2 < 2\lambda$ where [ is the wavelength of the propagating energy;
   means for controlling the propagation characteristics of the intermediate waveguide for a preselected frequency such that one mode of propagation of the intermediate waveguide matches a mode of propagation of the first waveguide and another mode of propagation of the intermediate waveguide matches a mode of propagation of the second waveguide, and for transferring optical energy between the modes in the intermediate waveguide.

2. An optical coupler as claimed in claim 1 wherein said controlling means includes a surface relief pattern on one surface of the intermediate waveguide.

3. An optical coupler as claimed in claim 1 wherein the intermediate waveguide is made of acousto-optic material and said controlling means includes an acoustic wave on one surface of the intermediate waveguide.

4. An optical coupler as claimed in claim 1 wherein the intermediate waveguide is made of electro-optic material and said controlling means includes an electric wave on one surface of the intermediate waveguide.

5. An optical coupler as claimed in claim 1 wherein the first and second waveguides are shaped to curve away from the intermediate waveguide thereby localizing the coupling region with the intermediate waveguide.

6. An optical coupler as claimed in claim 1 wherein the first waveguide is substantially parallel to each of a number of intermediate waveguides and each of a number of second waveguides are shaped to curve away from its respective intermediate waveguide thereby localizing the coupling region between the second waveguides and the intermediate waveguides.

7. An optical coupler as claimed in claim 1 wherein said intermediate waveguide includes a series of spaced control means along its length for coupling optical energy to adjacent second waveguides.

* * * * *

UNITED STATES PATENT AND TRADEMARK OFFICE
CERTIFICATE OF CORRECTION

PATENT NO. : 4026632

DATED : May 31, 1977

INVENTOR(S) : Kenneth O. Hill and Akira Watanabe

It is certified that error appears in the above-identified patent and that said Letters Patent are hereby corrected as shown below:

Column 4, line 27, the symbol " [ " should read --$\lambda$-- .

Signed and Sealed this twenty-third Day of August 1977

[SEAL]

Attest:

RUTH C. MASON
*Attesting Officer*

C. MARSHALL DANN
*Commissioner of Patents and Trademark*